(12) United States Patent
Yamane et al.

(10) Patent No.: US 12,429,085 B2
(45) Date of Patent: Sep. 30, 2025

(54) LOCK MECHANISM

(71) Applicant: BIZEN HATSUJO CO., LTD., Okayama (JP)

(72) Inventors: Michiyo Yamane, Okayama (JP); Yoshinori Taniguchi, Okayama (JP); Yasushi Taniguchi, Okayama (JP); Noriaki Satake, Okayama (JP)

(73) Assignee: BIZEN HATSUJO CO., LTD., Okayama (JP)

( * ) Notice: Subject to any disclaimer, the term of this patent is extended or adjusted under 35 U.S.C. 154(b) by 82 days.

(21) Appl. No.: 18/564,334

(22) PCT Filed: Jun. 13, 2022

(86) PCT No.: PCT/JP2022/023592
§ 371 (c)(1),
(2) Date: Nov. 27, 2023

(87) PCT Pub. No.: WO2023/037680
PCT Pub. Date: Mar. 16, 2023

(65) Prior Publication Data
US 2024/0247684 A1 Jul. 25, 2024

(30) Foreign Application Priority Data
Sep. 7, 2021 (JP) .................................. 2021-145239

(51) Int. Cl.
*F16C 11/10* (2006.01)
(52) U.S. Cl.
CPC .................................. *F16C 11/10* (2013.01)
(58) Field of Classification Search
CPC .......... F16C 11/10; F16C 11/103; F05B 57/00
(Continued)

(56) References Cited

U.S. PATENT DOCUMENTS 7,758,126 B2 * 7/2010 Haase ...................... B60N 2/20
297/378.12
8,851,562 B2 * 10/2014 Rezbarik ................ B60N 2/874
297/378.12
(Continued)

FOREIGN PATENT DOCUMENTS

CN 107781287 A 3/2018
JP S54-011025 U1 1/1979
(Continued)

OTHER PUBLICATIONS

WO-2020230310-A1; Kojima Morio (Year: 2020).*
(Continued)

*Primary Examiner* — Nathan Cumar
(74) *Attorney, Agent, or Firm* — Rankin, Hill & Clark LLP

(57) ABSTRACT

A lock mechanism includes a lock shaft (12) attached to a first bracket (3), a lock shaft support shaft (11), and a biasing spring that biases the lock shaft (12) in a direction in which the lock shaft (12) abuts against a second bracket (4). Rotational movement prevention stoppers (17 and 18) abut against each other, thereby preventing rotation of the first bracket (3) and the second bracket (4) in the locking direction and a backlash therebetween. The lock shaft (12) comes into contact with both a first side face (21) and a second side face (22), and a pair of tangents (25 and 26) to the lock shaft (12) are set to form a wedge (27), so that rotation of the first bracket (3) and the second bracket (4) in the locking direction and the opposite direction is prevented without backlash.

3 Claims, 11 Drawing Sheets

(58) Field of Classification Search
USPC .......................................................... 292/169
See application file for complete search history.

(56) References Cited

U.S. PATENT DOCUMENTS

| | | | | |
|---|---|---|---|---|
| 9,725,939 | B2* | 8/2017 | Adair | ................. E05D 11/0081 |
| 9,789,794 | B1* | 10/2017 | Roychoudhury | ...... B60N 2/874 |
| 11,208,019 | B2* | 12/2021 | Jiang | ........................ B60N 2/20 |
| 2006/0061187 | A1* | 3/2006 | Gauthier | ................. B60N 2/80 |
| | | | | 297/408 |
| 2019/0168650 | A1* | 6/2019 | Angelo | ................. B60N 2/841 |
| 2020/0238871 | A1* | 7/2020 | Inadome | ................ B60N 2/841 |
| 2021/0009020 | A1* | 1/2021 | Jang | ........................ B60N 2/856 |
| 2021/0387554 | A1* | 12/2021 | Wang | .................... B60N 2/841 |
| 2022/0219575 | A1* | 7/2022 | Ikeda | ....................... B60N 2/20 |

FOREIGN PATENT DOCUMENTS

| | | |
|---|---|---|
| JP | H10-035339 A | 2/1998 |
| JP | 2013-245811 A | 12/2013 |
| JP | 6148777 B1 | 6/2017 |
| WO | 2020/230310 A1 | 11/2020 |

OTHER PUBLICATIONS

JP-2868734-B2; Yamada Akishi (Year: 1999).*
JP-2020097262-A; Niimi Tadaoki (Year: 2020).*
JP-2018103701-A; Yamane Takeshi (Year: 2018).*
JP-2015033992-A; Otake Shigekazu (Year: 2015).*
JP-2001224439-A; Hachisuga Tadashi (Year: 2001).*
GB-2511599-A; Yetukuri Arjun V (Year: 2014).*
International Search Report issued in Patent Application No. PCT/JP2022/023592 dated Aug. 23, 2022.

* cited by examiner

FIG.9
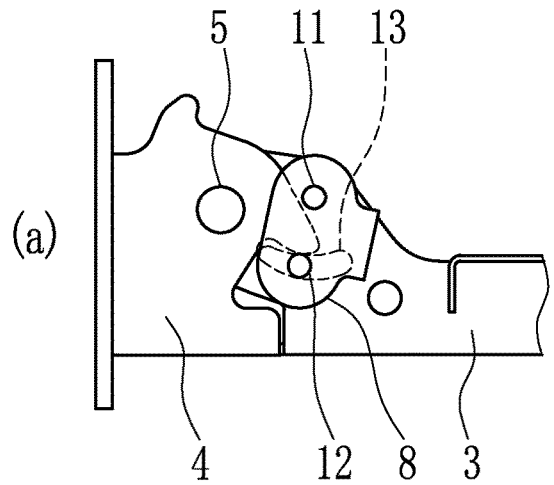
(a)
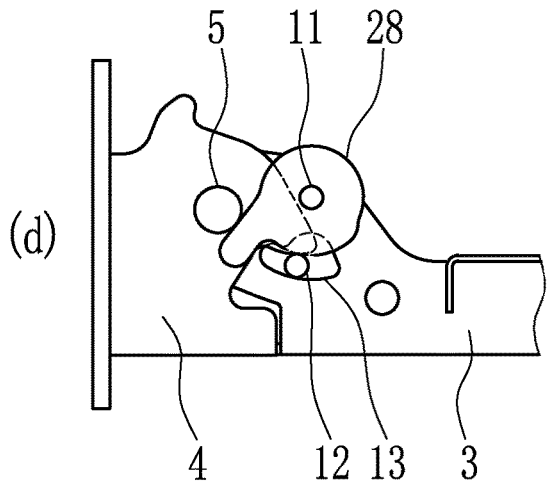
(d)
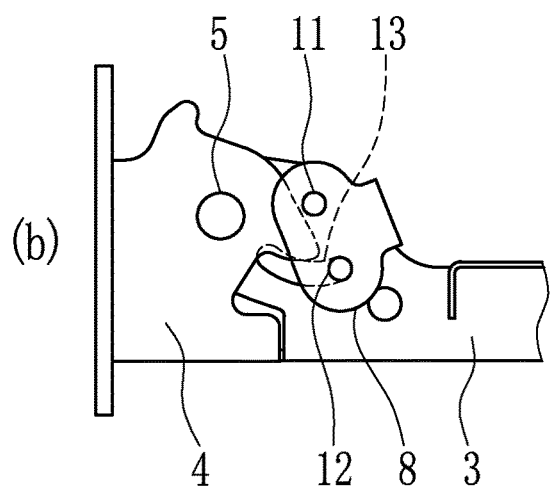
(b)
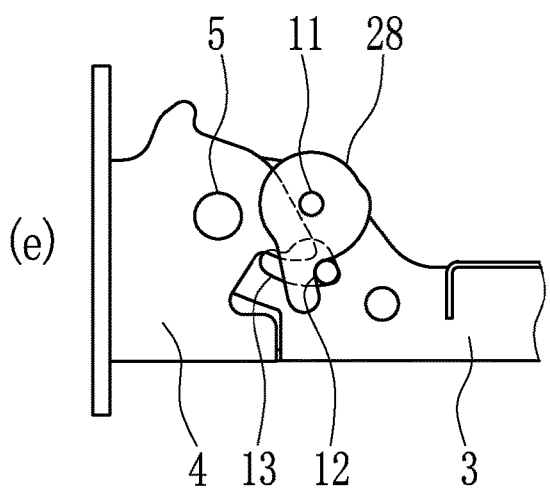
(e)
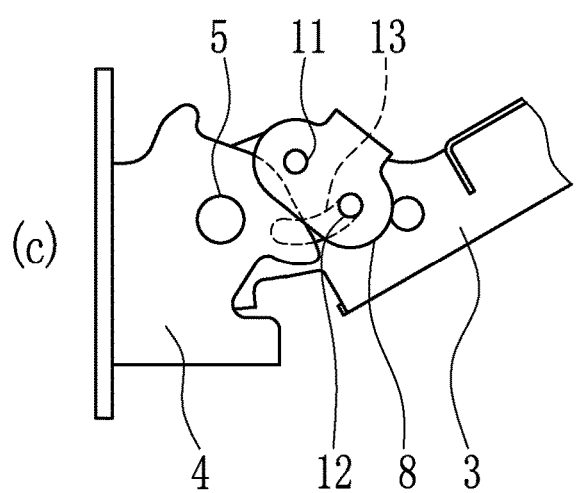
(c)
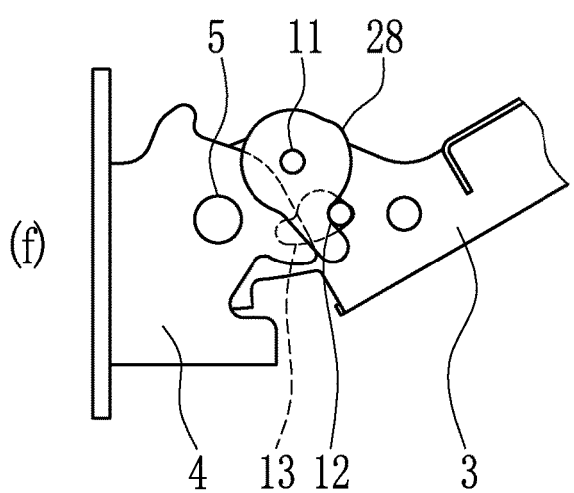
(f)

LOCK MECHANISM

TECHNICAL FIELD

The present disclosure relates to a lock mechanism used in a mechanism that has a movable part, such as a movable plate, that is fixed in a locked state when in use, such as when an article is placed on the movable part, and is rotated and housed when not in use.

BACKGROUND

Folding mechanisms using a hinge are used in various kinds of equipment, instruments, tools, apparatuses or the like. Some of such folding mechanisms are provided with a lock mechanism, and for example, a table can be kept steady during use by setting the lock mechanism in the locked state.

For example, Patent Literature 1 discloses a folding headrest, which has a structure in which a rotatable bracket 11 can rotate between an upper position to which the rotatable bracket 11 is rotated upward (when in use) and a front lower position to which the rotatable bracket 11 is rotated downwardly toward the front (when not in use).

The headrest includes a lock mechanism. An engagement part $X_1$ of the rotatable bracket 11 and an engagement part $C_1$ of a lock shaft are engaged with each other, thereby preventing forward rotation of the rotatable bracket 11 even if a force is applied to a headrest frame 12 fixed to the rotatable bracket 11 from the rear. An engagement part $B_4$ of a fixed bracket 22 and an engagement part $A_4$ of the rotatable bracket 11 are engaged with each other, thereby preventing rearward rotation of the rotatable bracket 11 even if a force is applied from the front.

With the lock mechanism of the headrest described above, forward rotation and rearward rotation of the rotatable bracket can be prevented during use with a simple structure (see the paragraph of Patent Literature 1).

CITATION LIST

Patent Literature

Patent Literature 1: Japanese Patent No. 6148777

SUMMARY

In the headrest described in Patent Literature 1, side walls $A_2$ and $A_3$ of the rotatable bracket 11 are each provided with an engagement part $X_1$ in a part close to the lower end thereof, and the engagement part $X_1$ is a notch part having a substantially semi-circular shape conforming to the outer shape of the lock shaft 24 (see the paragraph [0036], and FIGS. 1, 3 (a) and 8 of Patent Literature 1).

With such a configuration, when a force is applied from the rear to the headrest frame 12 fixed to the rotatable bracket 11, the lock shaft 24 abuts against the notch part having a substantially semi-circular shape, thereby preventing the forward rotation of the headrest frame 12. However, this configuration is not intended to prevent a backlash or rattle caused by a backlash when a force is applied.

The present disclosure is devised to solve the problems of the prior art described above, and an object of the present disclosure is to provide a lock mechanism for preventing rotation of brackets with respect to each other that can not only prevent such rotation but also occurrence of a backlash or rattle in a locked state.

To attain the object described above, a lock mechanism according to the present disclosure is characterized in that the lock mechanism includes: a first bracket; a second bracket; a hinge shaft that couples the first bracket and the second bracket to each other in such a manner that the first bracket and the second bracket are capable of rotating with respect to each other; and a lock unit for locking the first bracket and the second bracket by preventing rotation of the first bracket and the second bracket with respect to each other, the first bracket and the second bracket are provided with a rotational movement prevention stopper, the rotational movement prevention stoppers abutting against each other, when the first bracket or the second bracket is rotated in a locking direction, thereby preventing the rotation in the locking direction from proceeding beyond a predetermined position, the lock unit includes: a lock shaft attached in such a manner that the lock shaft is capable of moving in a long hole formed in the first bracket; a lock shaft support shaft rotatably and slidably attached to the first bracket; a fixture piece that is fixed to the lock shaft support shaft, and rotates to push the lock shaft to release the locking as the lock shaft support shaft rotates or slides; and a biasing spring that biases the lock shaft in a direction in which the lock shaft abuts against the second bracket, the rotational movement prevention stoppers abut against each other to prevent rotation of the first bracket and the second bracket in the locking direction without backlash, and provided that an inner side face of the long hole is a first side face, and a side face of the second bracket, is a second side face, when the rotational movement prevention stoppers abut against each other, the lock shaft is in contact with both the first side face and the second side face, and a pair of tangents to the lock shaft at points of contact of the contact form a wedge with a vertex facing in the direction of movement of the lock shaft so that the first bracket and the second bracket are in a locked state in which rotation of the first bracket and the second bracket in a direction opposite to the locking direction is prevented without backlash.

With this configuration, in the locked state, not only rotation of the first bracket and the second bracket in both the locking direction and the opposite direction but also a backlash and rattle caused by a backlash can be prevented. In addition, since the locked state is not provided by fitting members on each other, even though the positions of the two points of contact of the lock shaft may vary with the product, the locked state can be ensured, as far as the wedge is formed.

In the lock mechanism according to the present disclosure described above, preferably, the mechanisms for implementing the locked state are provided at two, left and right, positions along an axial direction of the hinge shaft. With this configuration, stronger locking can be achieved.

In the lock mechanism according to the present disclosure described above, preferably, the lock shaft and the fixture piece are separate from and independent of each other, the lock shaft is capable of moving in the long hole without being restrained by the lock shaft support shaft or the fixture piece, so that the lock shaft is prevented from going into the locked state at only one of the two, left and right, positions. With this configuration, even if the two, left and right, mechanisms for implementing the locked State varies with each other, the lock shaft can move in the long holes without being restrained by the lock shaft support shaft or fixture piece, so that the lock shaft can be prevented from coming off the fixed bracket and the lock shaft can be prevented from being in the locked state at only one of the two, left and right, positions.

Advantages of the present disclosure are as described above. According to the present disclosure, in the locked state, not only rotation of the first bracket and the second bracket in both the locking direction and the opposite direction but also a backlash and rattle caused by a backlash can be prevented. In addition, since the locked state is not provided by fitting members on each other, even though the positions of the two points of contact of the lock shaft may vary with the product, the locked state can be ensured as far as the wedge is formed.

BRIEF DESCRIPTION OF THE DRAWINGS

FIG. 9 are side views illustrating unlocking processes in the embodiment of the present disclosure;

FIG. 10 is a perspective view illustrating an example in which a lock mechanism according to an embodiment of the present disclosure is applied to a seat of an automobile or the like;

FIG. 12 is a perspective view illustrating an example in which a lock mechanism according to an embodiment of the present disclosure is applied to a table used in a vehicle; and.

DETAILED DESCRIPTION OF THE EMBODIMENTS

Figure 1:
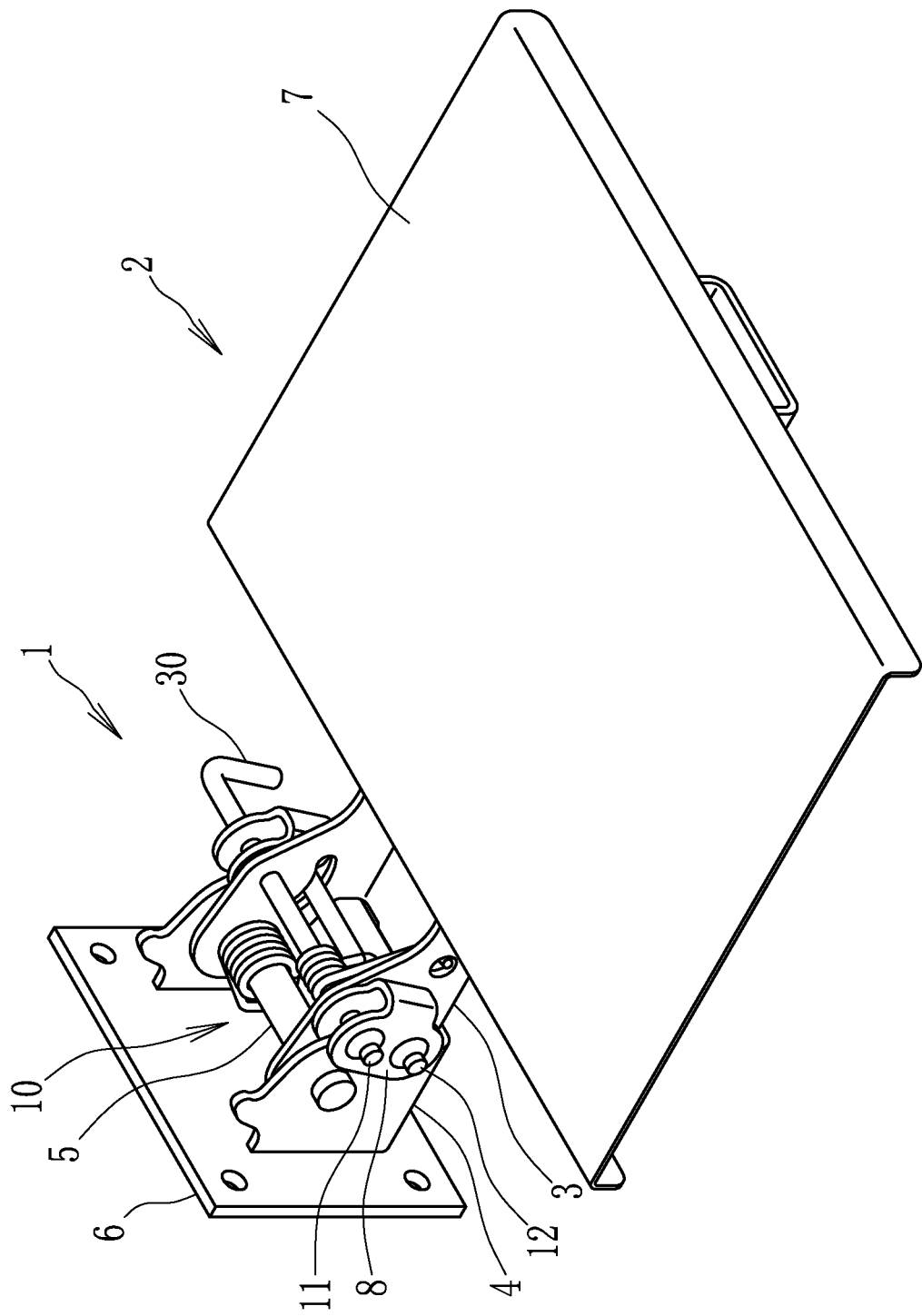
FIG. 1 is a perspective view of an appearance of a folding table including a lock mechanism according to an embodiment of the present disclosure.

In the following, an embodiment of the present disclosure will be described with reference to the drawings. FIG. 1 is a perspective view of an appearance of a folding table including a lock mechanism 1 according to the embodiment of the present disclosure. The lock mechanism 1 includes a movable bracket 3 (first bracket) and a fixed bracket 4 (second bracket) coupled by a hinge shaft 5 so as to be rotatable with respect to each other.

The lock mechanism 1 is fixed to an installation plate 6, and the folding table 2 can be installed by attaching the installation plate 6 to an installation target object (not illustrated). A top plate 7 is fixed to the movable bracket 3. FIG. 1 illustrates a horizontal position of the top plate 7 when in use. When not in use, the top plate 7 can be raised from the position in FIG. 1 to fold the top plate 7 into a vertical position. As described in detail later, in the position in FIG. 1, the movable bracket 3 and the top plate 7 integrated therewith are in a locked state, have no backlash and are steady.

The lock mechanism 1 has various applications and is not limited to a particular application. For example, the lock mechanism 1 can be used for a folding headrest, armrest, ottoman or footrest, which are accessories of an automobile. The lock mechanism 1 can also be used for a folding chair for a vehicle, a folding table or a folding shelf. In any case, the movable part is in the locked state when in use and folded when not in use.

In FIG. 1, the lock mechanism 1 includes a lock unit 10. The lock unit 10 is a primary mechanism for holding the movable bracket 3 in the locked state and is also a mechanism for releasing the locked state. Details of the lock unit 10 will be described mainly with reference to FIG. 2.

Figure 2:
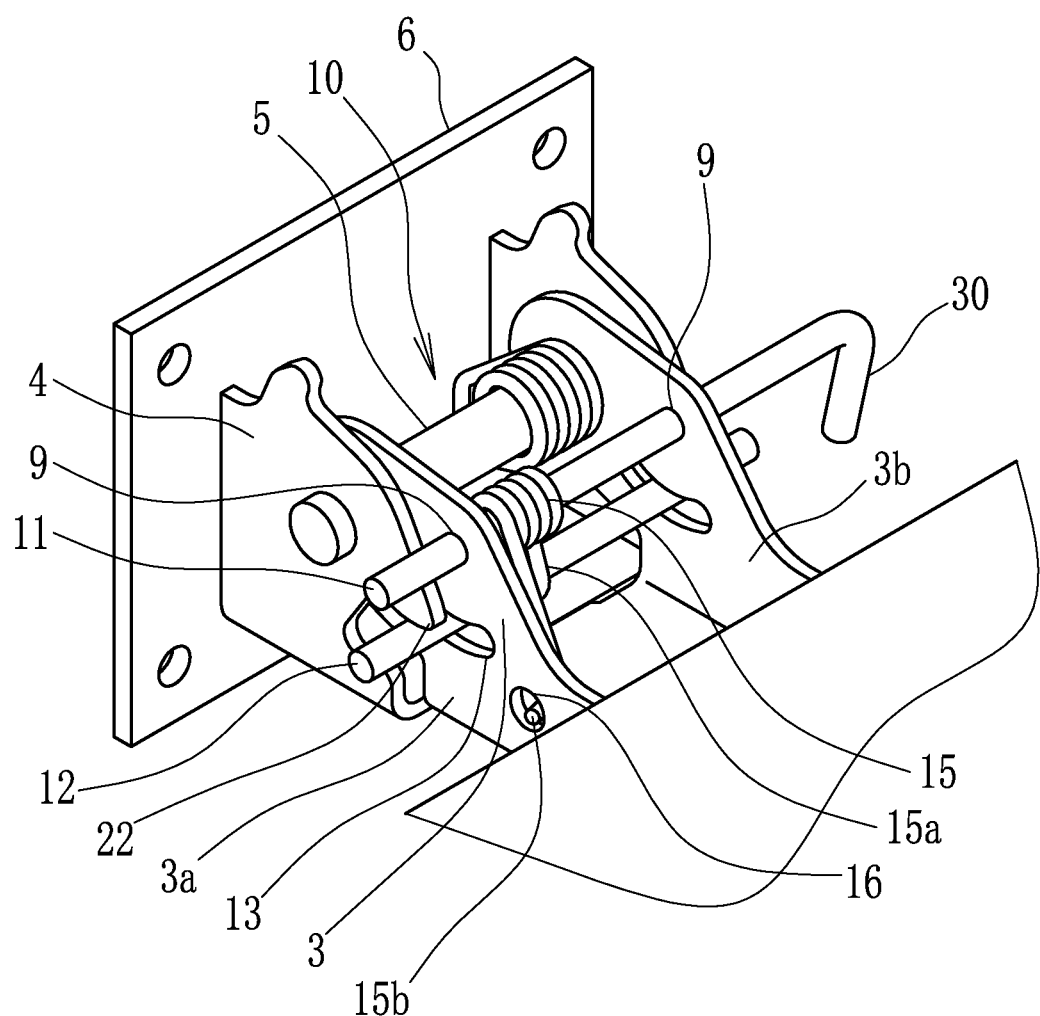
FIG. 2 is a perspective view illustrating essential parts of the lock mechanism illustrated in FIG. 1.

FIG. 2 is a perspective view illustrating essential parts of the lock mechanism 1 illustrated in FIG. 1. For the convenience of illustration, a fixture piece 8, which is illustrated in FIG. 1, is not illustrated in FIG. 2. In FIG. 2, a lock shaft support shaft 11 is rotatably and slidably inserted in holes 9 formed in a pair of side walls 3a and 3b of the movable bracket 3. Similarly, a lock shaft 12 is inserted in long holes 13 formed in the pair of side walls 3a and 3b of the movable bracket 3. In FIG. 1, the lock shaft support shaft 11 and the lock shaft 12 are coupled by the fixture piece 8. The lock shaft support shaft 11 and the lock shaft 12 are fixed to the fixture piece 8 by welding.

In FIG. 2, lock shaft support shaft 11 is inserted in a biasing spring 15. One hook 15a of the biasing spring 15 is caught on the lock shaft 12, and another hook 15b is caught in a hole 16.

With such a configuration, the lock shaft support shaft 11 and the lock shaft 12 are coupled by the fixture piece 8, and the biasing spring 15 is interposed between the lock shaft support shaft 11 and the lock shaft 12. The biasing spring 15 exerts a biasing force to the lock shaft 12 in such a direction in which the lock shaft 12 abuts against the fixed bracket 4.

Figure 3:
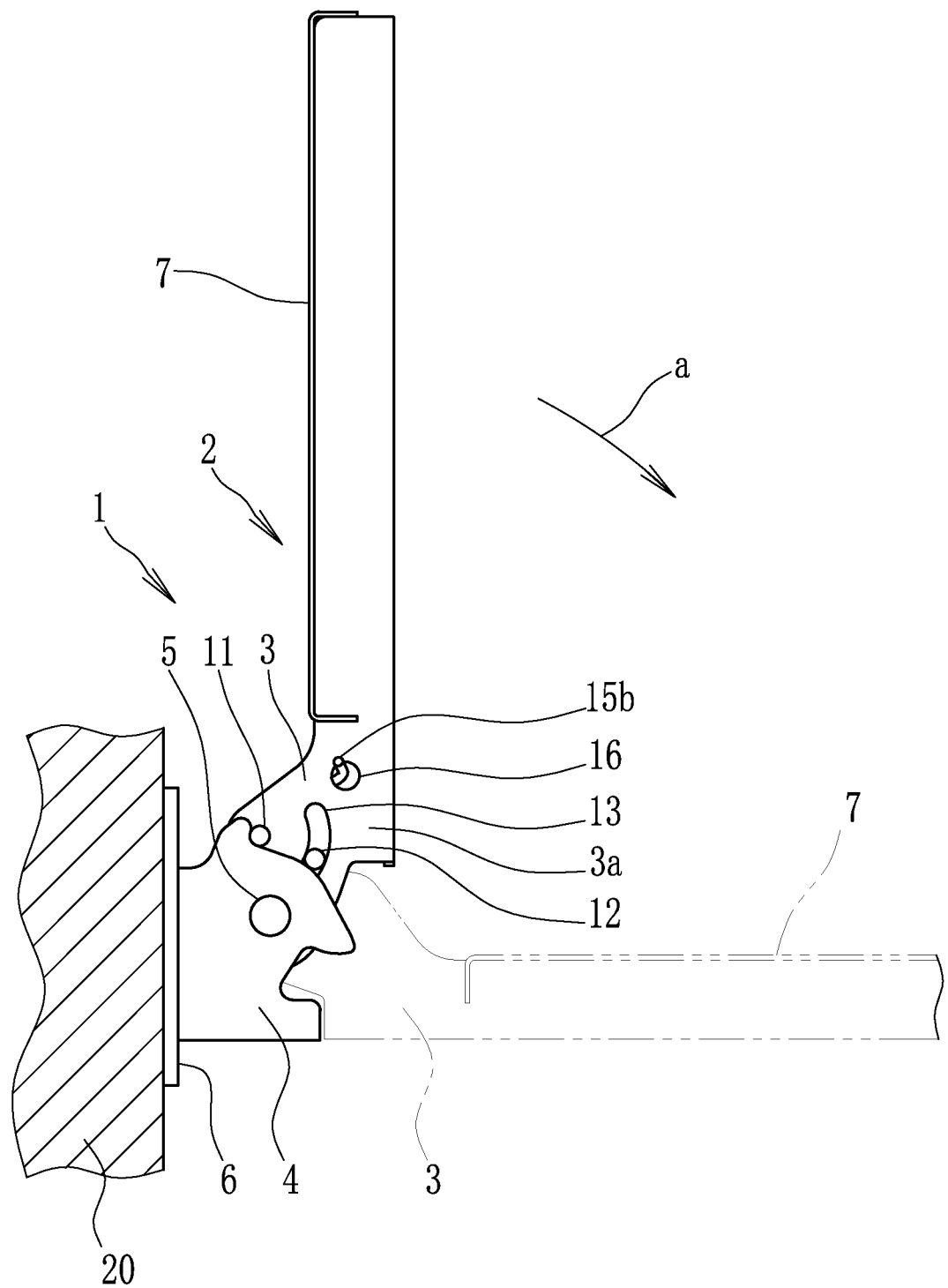
FIG. 3 is a side view of a folding table with a top plate folded in the embodiment of the present disclosure.
Figure 4:
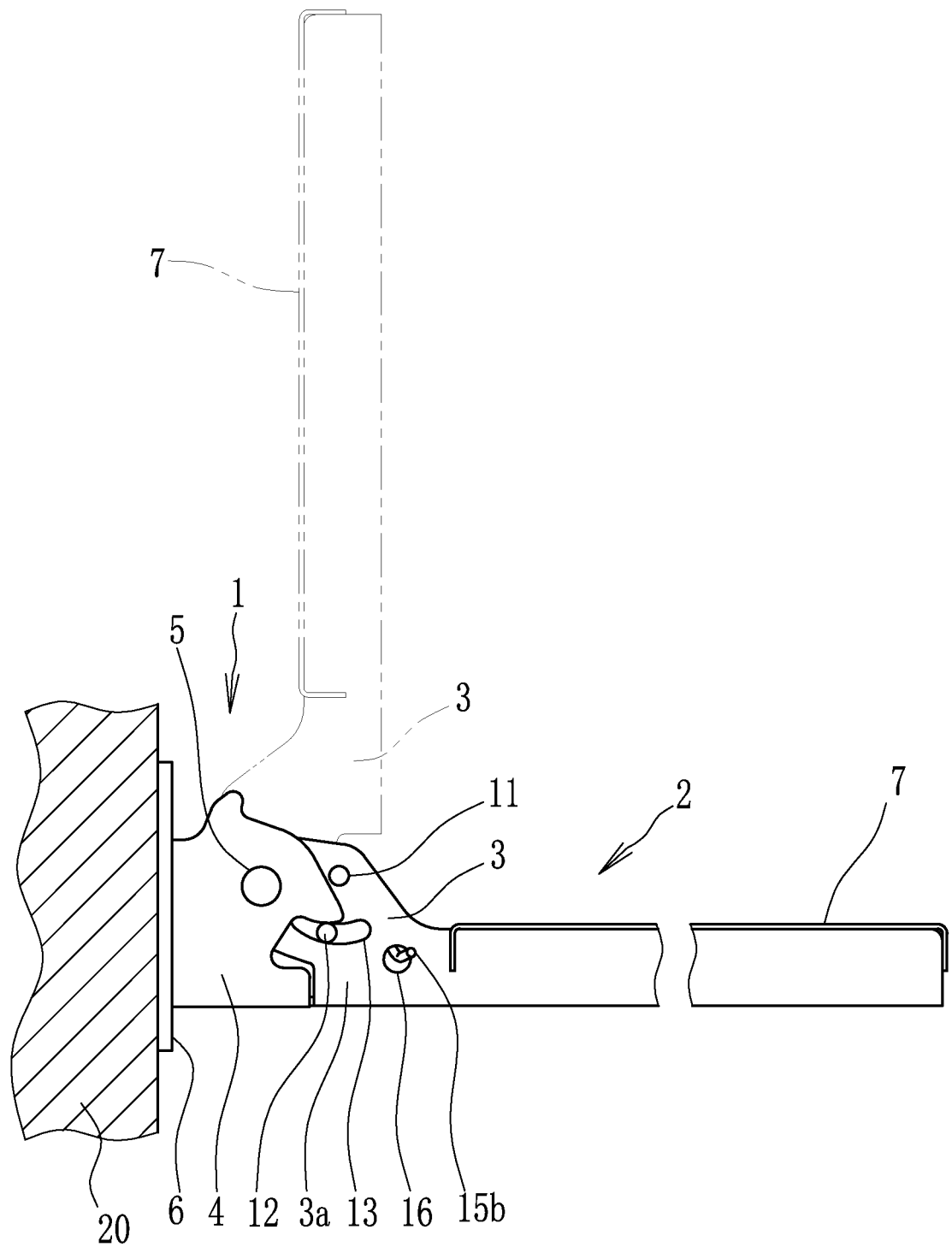
FIG. 4 is a side view of the folding table with the top plate rotated from the position in FIG. 3 into the horizontal position.

FIG. 3 is a side view of the folding table 2 with the top plate 7 folded. FIG. 4 is a side view of the folding table 2 with the top plate 7 rotated from the position in FIG. 3 into the horizontal position. In FIG. 3, the installation plate 6 is attached to an installation target object 20. In this state, the movable bracket 3 and the top plate 7 integrated therewith are rotatable about the hinge shaft 5 (in the direction of the arrow a). As the rotation proceeds, the movable bracket 3 is eventually locked in the horizontal position as illustrated in FIG. 4. The principle of the locking will be described later.

Figure 5:
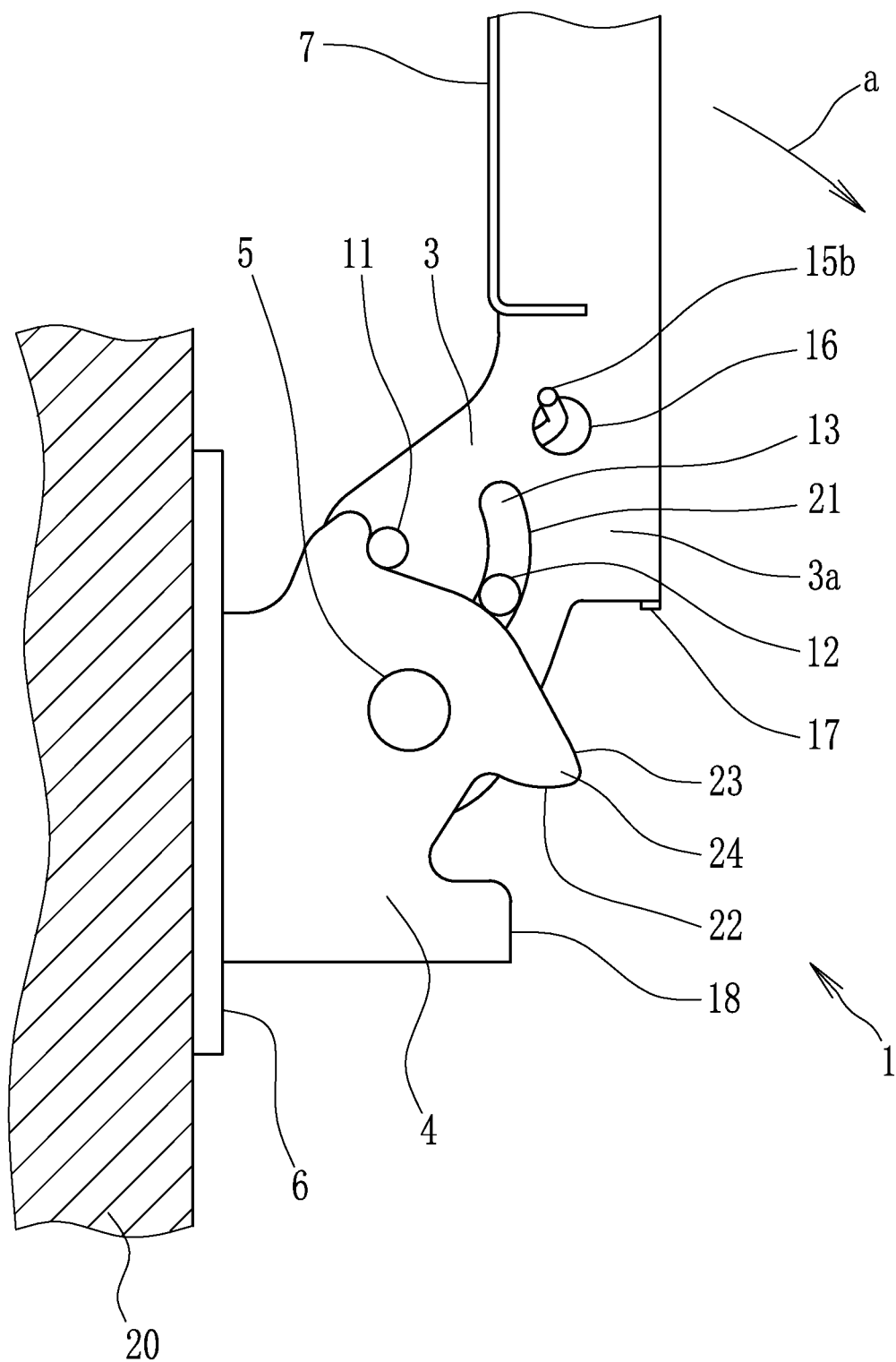
FIG. 5 is a side view illustrating a folded state of a movable bracket in the embodiment of the present disclosure.

In the following, with reference to FIGS. 5 to 8, an operation of the lock mechanism 1 will be specifically described. FIG. 5 is an enlarged view of essential parts in FIG. 3. FIG. 5 illustrates a folded state of the movable bracket 3, and the movable bracket 3 is in the vertical position. In FIG. 5, the fixed bracket 4 is fixed to the installation target object 20, which is an immobile body, via the installation plate 6. Therefore, the top plate 7 integrated with the movable bracket 3 can be manually rotated about the hinge shaft 5 (in the direction of the arrow a) while keeping the fixed bracket 4 fixed.

In FIG. 5, inner longitudinal side faces of the long hole 13 face each other. For the sake of convenience, the inner side face on the side of the direction of rotation of the top plate 7 (the direction of the arrow a) is referred to as a first side face 21. The fixed bracket 4 has a protrusion part 24 in a tapered shape, and a pair of side faces of the protrusion part 24 merge with each other at the tip end of the protrusion part 24. For the sake of convenience, one of the pair of side faces is referred to as a second side face 22, and the other side face is referred to as a third side face 23. As described later, as the rotation of the movable bracket 3 proceeds, the first side face 21 and the second side face 22 face each other (see FIG. 7).

Figure 7:
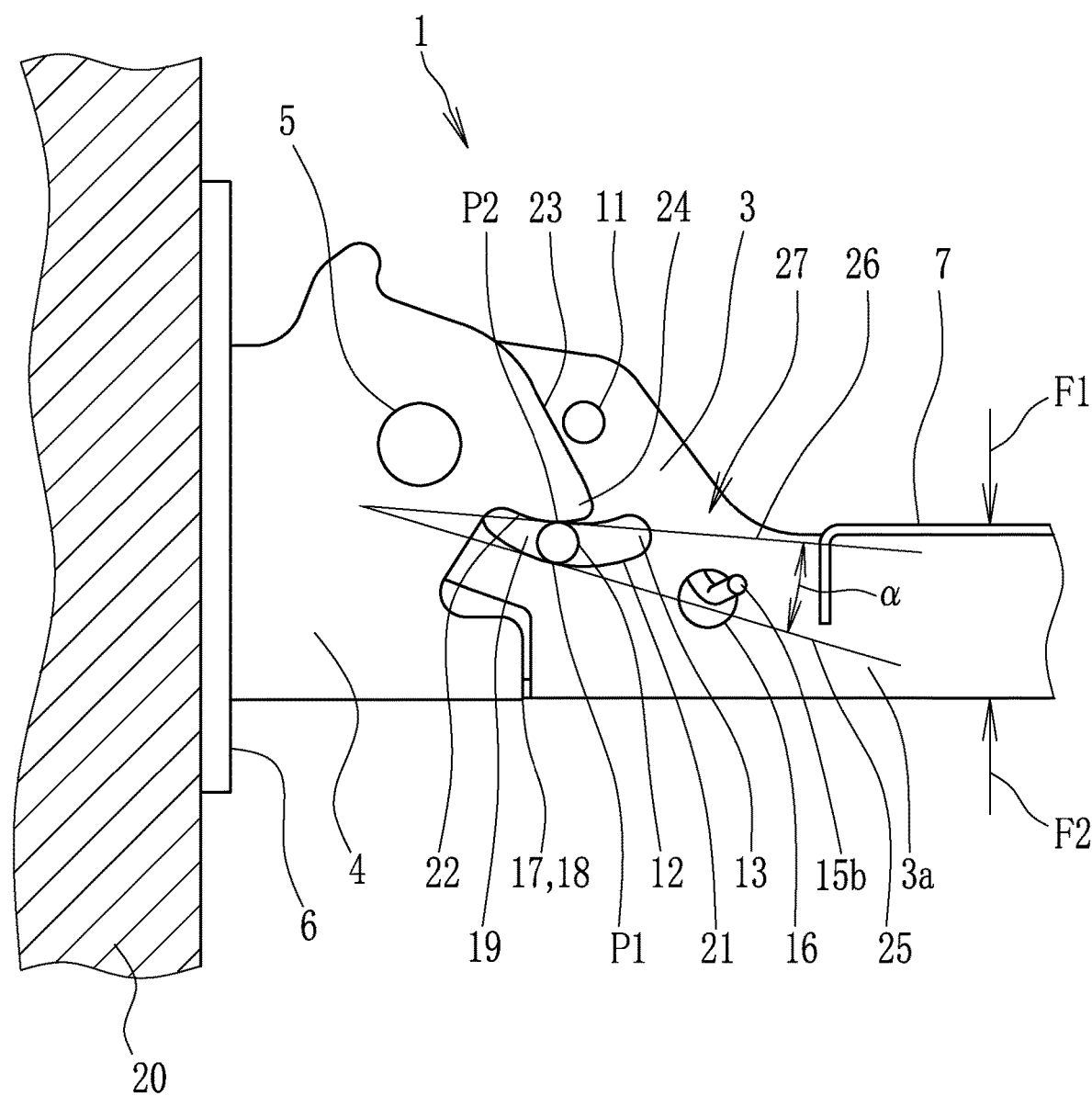
FIG. 7 is a side view illustrating a position of the movable bracket having further rotated from the position in FIG. 6.

In FIG. 5, the movable bracket 3 is provided with a rotational movement prevention stopper 17, and the fixed bracket 4 is provided with a rotational movement prevention stopper 18. As the rotation of the movable bracket 3 about the hinge shaft 5 proceeds from the position in FIG. 5, the rotational movement prevention stopper 17 moves toward the rotational movement prevention stopper 18. As illustrated in FIG. 7, the movable bracket 3 eventually becomes horizontal. As described in detail later, in this position, the rotational movement prevention stoppers 17 and 18 abut against each other.

As described above, the biasing spring 15 illustrated in FIG. 2 exerts a biasing force in a direction in which the lock shaft 12 is pushed toward the fixed bracket 4 and abuts against the fixed bracket 4. Therefore, when the movable bracket 3 rotates about the hinge shaft 5 in the direction of the arrow a from the position in FIG. 5, the lock shaft 12 moves toward the position of the rotational movement prevention stopper 18 while moving in the long holes 13 and sliding on the third side face 23 of the protrusion part 24.

Figure 6:
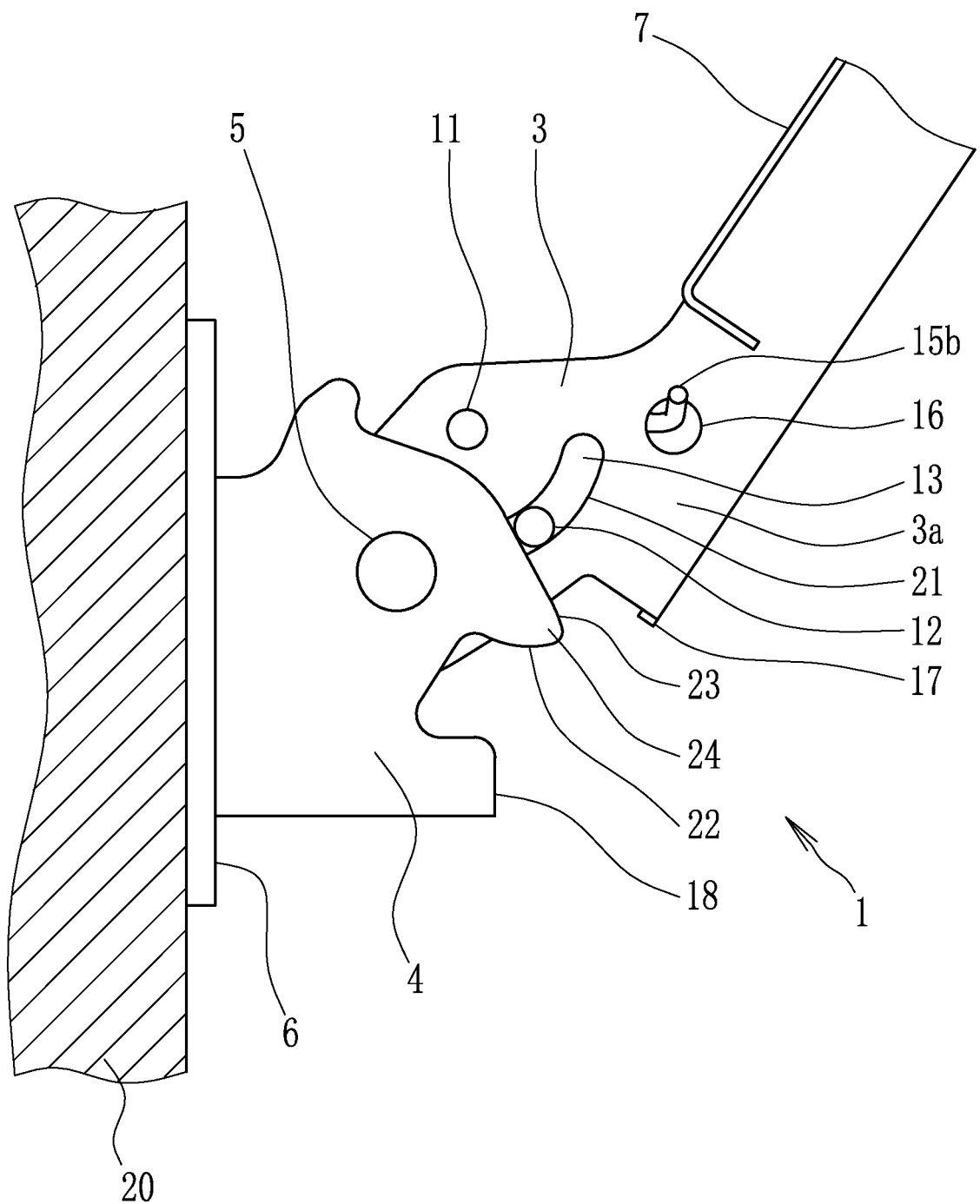
FIG. 6 is a side view illustrating a position of the movable bracket having rotated from the position in FIG. 5.
Figure 8:
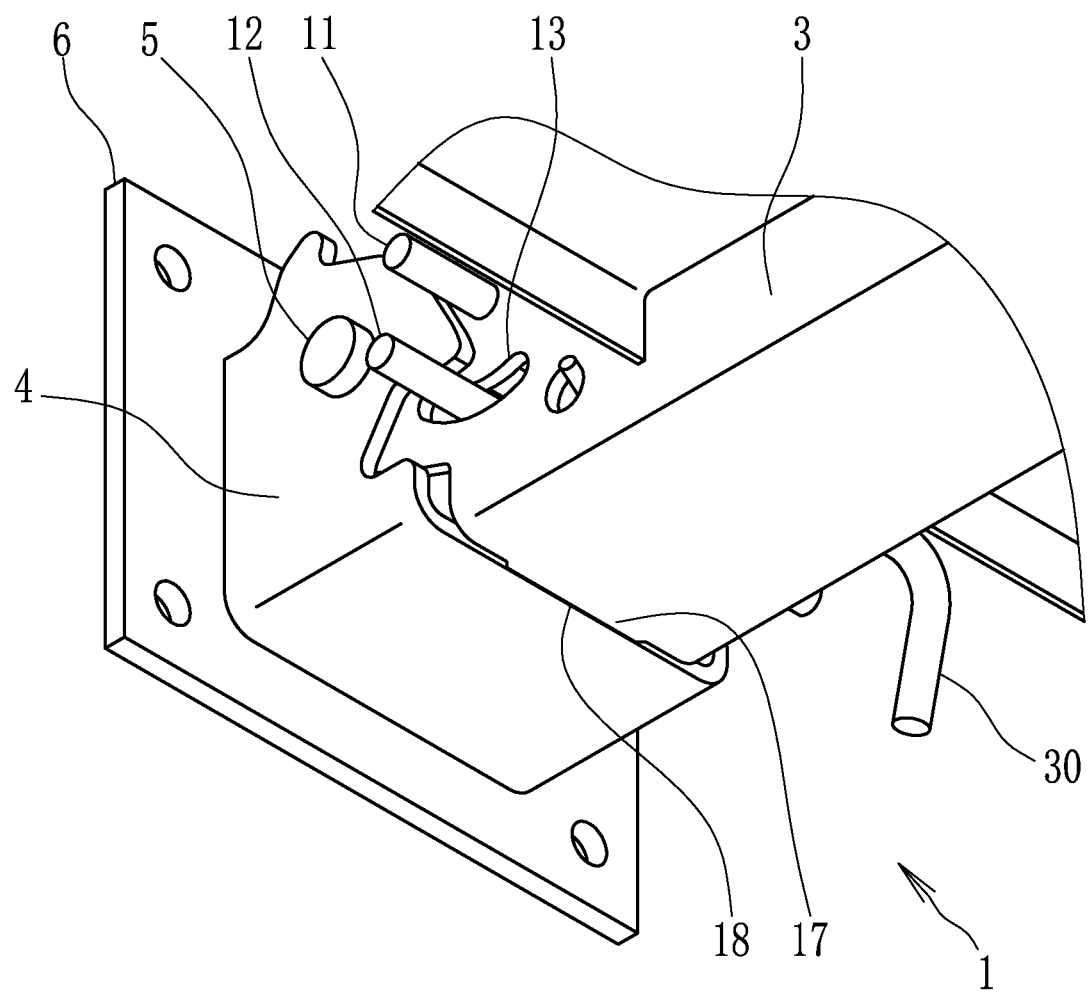
FIG. 8 is a perspective view of the lock mechanism in FIG. 7 viewed from the bottom.

FIG. 6 illustrates a position of the movable bracket 3 having rotated from the position in FIG. 5 in which the lock shaft 12 is sliding on the third side face 23 of the protrusion part 24. FIG. 7 illustrates a position of the movable bracket 3 having further rotated from the position in FIG. 6 in which the lock shaft 12 has climbed over the tip end of the protrusion part 24 and moved to the side of the second side face 22. In the position in FIG. 7, the rotational movement prevention stoppers 17 and 18 abut against each other, and the movable bracket 3 is horizontal. FIG. 8 is a perspective view of the lock mechanism 1 in FIG. 7 viewed from the bottom. As illustrated in FIG. 9, the rotational movement prevention stopper 18 abuts against the movable bracket 3 in the part where the rotational movement prevention stopper 17 is formed. In the state where the rotational movement prevention stoppers 17 and 18 abut against each other as illustrated in FIGS. 7 and 8, the movable bracket 3 does not further rotate from the horizontal position illustrated in FIG. 7 even if a force F1 is applied in a direction to push the movable bracket 3 down in FIG. 7.

Furthermore, in FIG. 7, a gap space 19 in which the first side face 21 of the long hole 13 and the second side face 22 of the protrusion part 24 face each other is formed. When the lock shaft 12 is biased by the biasing spring 15 (see FIG. 2) and pushed into the gap space 19, the lock shaft 12 is located between the first side face 21 and the second side face 22 and in contact with both the first side face 21 and the second side face 22. This state is a locked state, and even if a force F2 is applied in a direction to push the movable bracket 3 up, the movable bracket 3 is prevented from rotating and producing a backlash.

Such a locked state can be implemented because when the rotational movement prevention stoppers 17 and 18 abut against each other, the lock shaft 12 comes into contact with both the first side face 21 and the second side face 22 for the first time, and tangents to the lock shaft 12 form a wedge-like shape described later. In the following, this will be specifically described.

In FIG. 7, provided that a point of contact between the lock shaft 12 and the first side face 21 is a point P1, and a point of contact between the lock shaft 12 and the second side face 22 is a point P2, a tangent 25 at the point P1 and a tangent 26 at the point P2 form an angle α therebetween and form a wedge 27 with the vertex facing in the direction of movement of the lock shaft 12.

The wedge 27 spreads in the direction opposite to the vertex thereof. Therefore, the lock shaft 12 can move in the long holes 13 under the biasing force of the biasing spring 15 and the rotation of the movable bracket 3 is not prevented until immediately before the wedge 27 is formed (until immediately before the rotational movement prevention stoppers 17 and 18 abut against each other). In other words, when the rotational movement prevention stoppers 17 and 18 abut against each other and the lock shaft 12 is held between the first side face 21 and the second side face 22, the movable bracket 3 goes into the locked state for the first time in which the movable bracket 3 produces no backlash under both the force F1 in the push-down direction and the force F2 in the push-up direction.

More specifically, in order for the lock shaft 12 to move in the long hole 13, clearances are required between the lock shaft 12 and the pair of inner longitudinal side faces of the long hole 13. Therefore, when the lock shaft 12 moves in the long hole 13 when the long hole 13 is not covered, the lock shaft 12 does not come into contact with both the pair of inner side faces. And even if the lock shaft 12 comes into contact with one of the inner side faces, there is a clearance between the lock shaft 12 and the other inner side face. As far as there is a clearance, the lock shaft 12 can move in the long hole 13, and the rotation of the movable bracket 3 is not prevented. However, when the rotational movement prevention stoppers 17 and 18 abut against each other, the lock shaft 12 goes into the locked state in which the lock shaft 12 is in contact with both the first side face 21 and the second side face 22.

As described above, in the locked state, the rotational movement prevention stoppers 17 and 18 abut against each other as illustrated in FIG. 7, and therefore, the movable bracket 3 does not further rotate or produce a backlash even if the force F1 is applied in the direction to push the movable bracket 3 down.

On the other hand, in the locked state, the lock shaft 12 is in contact with the first side face 21 and the second side face 22 at the points P1 and P2 as illustrated in FIG. 7, and therefore, there is no clearance between the lock shaft 12 and the first side face 21 and between the lock shaft 12 and the second side face 22. Since the lock shaft 12 is held between the first side face 21 and the second side face 22 without clearance in this way, the movable bracket 3 does not rotate or produce a backlash even if the force F2 is applied in the direction to push the movable bracket 3 up.

The locked state relies on the premise that the components are designed so as to satisfy the condition that the wedge 27 is formed when the rotational movement prevention stoppers 17 and 18 abut against each other, and the condition can be satisfied with reliability by making adjustments in assembly by taking the variations of the accuracy of the components into consideration. In this regard, according to this embodiment, the locked state is not provided by fitting members on each other. Therefore, even though the positions of the points P1 and P2 may vary with the product, it is essential only that the wedge 27 is formed, and the locked state is ensured as far as the wedge 27 is formed.

In the following, unlocking will be described. The locked state in FIG. 7 can be released, and the movable bracket 3 can be returned to the folded position illustrated in FIG. 5 by unlocking. In FIGS. 1 and 2, an unlocking lever 30 is integrated with the lock shaft support shaft 11. Unlocking is performed by operating the unlocking lever 30. FIGS. 9(a) to 9(c) illustrate a process of unlocking. In FIG. 9(a), the lock shaft support shaft 11 and the fixture piece 8 rotate as the unlocking lever 30 (see FIG. 1) is operated to rotate, and the lock shaft 12 is pushed by the fixture piece 8 as a result of the rotation. As a result, as illustrated in FIG. 9 (*b*), the lock shaft 12 moves in the long hole 12 and goes out of engagement with the fixed bracket 4, and thus the locked state is released. After that, as illustrated in FIG. 9 (*c*), the movable bracket 3 can be rotated.

FIG. 9 (*d*) to 9(*f*) illustrates another example of the unlocking. Although the lock shaft support shaft 11 and the lock shaft 12 are coupled by the fixture piece 8 in the embodiment described above, the lock shaft 12 may be separate from and independent of the fixture piece. In the example in FIG. 9 (*d*), although the lock shaft support shaft 11 is fixed to a fixture piece 28, the lock shaft 12 and the fixture piece 28 are separate from and independent of each other.

As described in detail later, in this embodiment, mechanisms for implementing the locked state are provided at two, left and right, positions along the axial direction of the hinge shaft 5 (see FIG. 5). If the lock shaft 12 and the fixture piece 28 are separate from and independent of each other as illustrated in FIG. 9(*d*), even if the two, left and right, mechanisms for implementing the locked state vary with each other, the lock shaft 12 can move in the long holes 13 without being restrained by the lock shaft support shaft 11 or the fixture piece 28, so that the lock shaft 12 can be prevented from coming off the fixed bracket 5 and the lock shaft 12 can be prevented from being in the locked state at only one of the two, left and right, positions.

In FIG. 9 (*d*), as the unlocking lever 30 (see FIG. 1) is operated to rotate, the lock shaft support shaft 11 and the fixture piece 28 rotate, the fixture piece 28 comes into contact with the lock shaft 12 and pushes the lock shaft 12, and the lock shaft 12 moves in the long hole 12. As a result, as illustrated in FIG. 9(*e*), the lock shaft 12 and the fixed bracket 4 are disengaged from each other, and the locked state is released. After that, as illustrated in FIG. 9(*f*), the movable bracket 3 can be rotated.

The unlocking using the unlocking lever 30 is an example, and the unlocking lever 30 may be a component separate from the lock shaft support shaft 11. Alternatively, an unlocking piece may be additionally provided, and the lock shaft 12 may be pushed by the unlocking piece. Furthermore, the unlocking lever 30 may be operated with a wire.

Although locking on the side of one side wall 3*a* of the pair of side walls 3*a* and 3*b* of the movable bracket 3 in FIG. 2 has been described in the embodiment described above, the locked state is implemented on the side of the other side wall 3*b* with the same structure as that on the side of the side wall 3*a*. In this case, the lock shaft 12 needs to be in contact with the first and second side faces at the two points P1 and P2 on both the sides of the side walls 3*a* and 3*b* when the rotational movement prevention stoppers 17 and 18 abut against each other as illustrated in FIG. 7. In this embodiment, this state can be implemented even if the accuracy of the components or the accuracy of assembly varies.

Specifically, according to this embodiment, the lock shaft support shaft 11 and the lock shaft 12, which are separate from and independent of each other as illustrated in FIG. 2, are coupled by the fixture piece 8 as illustrated in FIG. 1. Therefore, in the assembly process, the lock shaft support shaft 11 and the lock shaft 12 can be welded to the fixture piece 8 as illustrated in FIG. 1 after the rotational movement prevention stoppers 17 and 18 are brought into contact with each other as illustrated in FIG. 7, and the lock shaft 12 is adjusted so that the lock shaft 12 is in contact with the first and second side faces at the two points on both the sides of the side walls 3*a* and 3*b*. In this way, the lock shaft 12 of the finished product is in contact with the first and second side faces at the two points on both the sides of the side walls 3*a* and 3*b* with reliability when the rotational movement prevention stoppers 17 and 18 abut against each other.

In this embodiment, an example has been described in which the lock mechanisms are provided on both sides of the fixed bracket 2. However, the lock mechanism may be provided only one side. Furthermore, the lock shaft support shaft 11 and the lock shaft 12 may be integrally formed by bending one rod material into a U-shape, and in such a case, the U-shaped part substantially serves as the fixture piece. Furthermore, the coupling between the lock shaft support shaft 11 and the lock shaft 12 and the fixture piece 8 is not limited to welding and may be a mechanical coupling using a screw, a bolt or the like.

In the following, example applications of the lock mechanism will be described. FIGS. 10 to 13 illustrate example applications of the lock mechanism. Each of these drawings is a schematic view of the appearance of the example application, and details of the mechanism are not illustrated.

Figure 10:
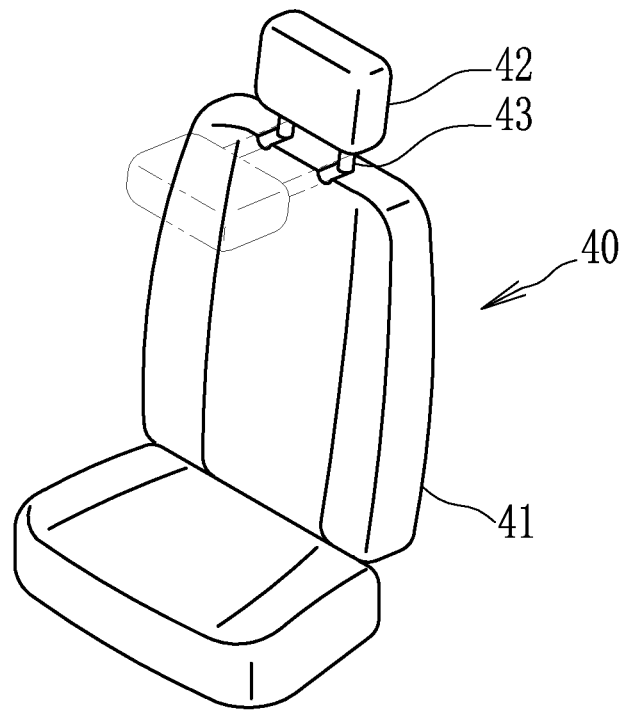

FIG. 10 is a perspective view illustrating an example in which a lock mechanism according to an embodiment of the present disclosure is applied to a seat 40 of an automobile or the like. In FIG. 10, a headrest 42 is attached to the top of a seatback 41. An arm 43 that supports the headrest 42 corresponds to the movable bracket 3 in the embodiment described above. The headrest 42 is in the locked state when the headrest 42 is located on top of the seatback 41, and the headrest 42 can be tilted to the front side by unlocking the lock mechanism.

Figure 11:
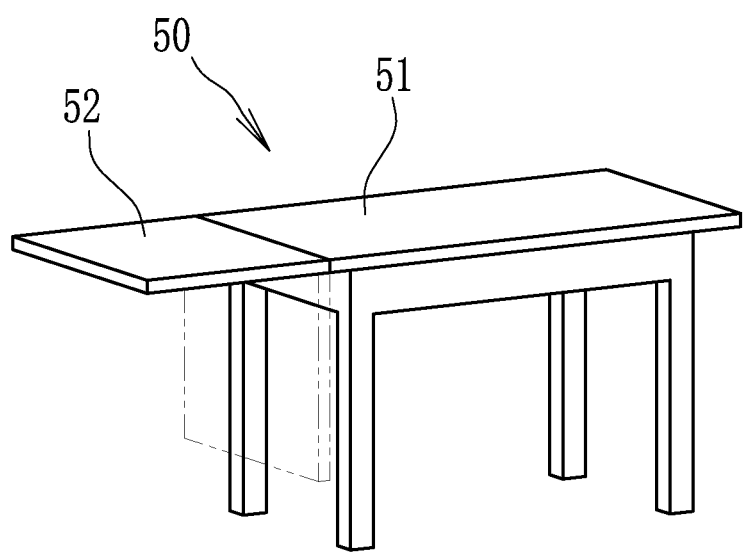
FIG. 11 is a perspective view illustrating an example in which a lock mechanism according to an embodiment of the present disclosure is applied to a folding table.

FIG. 11 is a perspective view illustrating an example in which a lock mechanism according to an embodiment of the present disclosure is applied to a folding table 50. In FIG. 11, an auxiliary table 52 is attached to an end part of a top plate 51. The auxiliary table 52 is in the locked state when the auxiliary table 52 is in the horizontal position, and the auxiliary table 52 can be folded by unlocking the lock mechanism.

Figure 12:
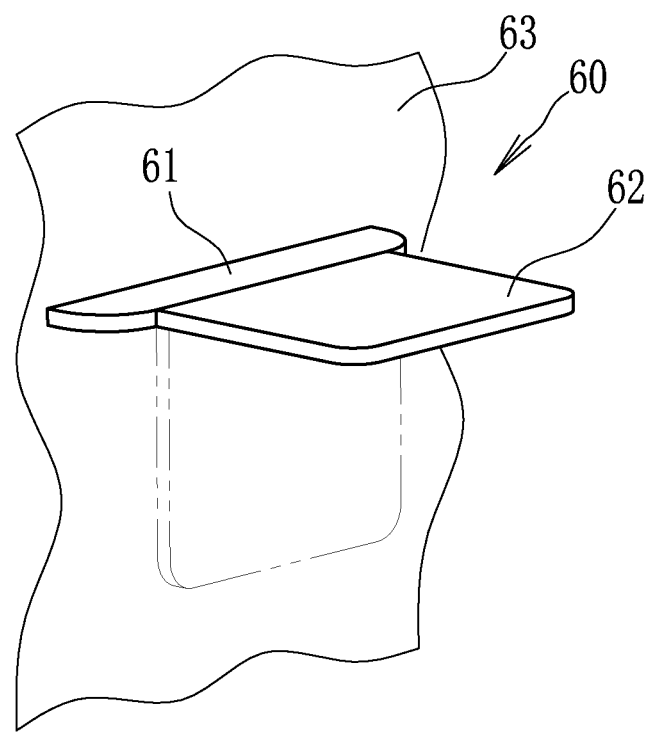

FIG. 12 is a perspective view illustrating an example in which a lock mechanism according to an embodiment of the present disclosure is applied to a table used in a vehicle. In FIG. 12, a shelf 61 is fixed to a wall surface 63, and a tilting table 62 is attached to the shelf 61. The tilting table 62 is in the locked state when the tilting table 62 is in the horizontal position, and the tilting table 62 can be folded by unlocking the lock mechanism.

Figure 13:
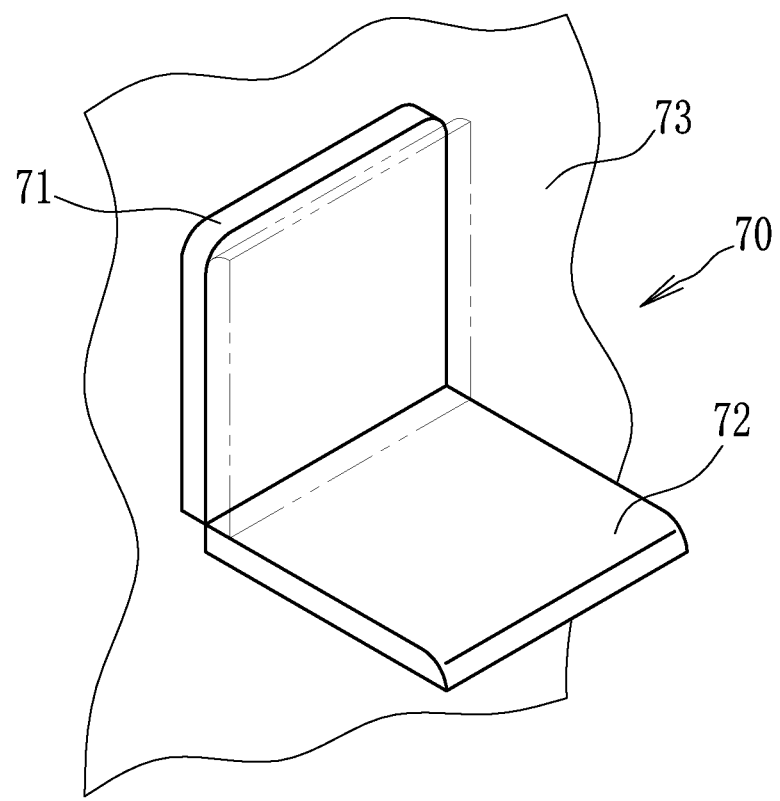
FIG. 13 is a perspective view illustrating an example in which a lock mechanism according to an embodiment of the present disclosure is applied to a folding chair.

FIG. 13 is a perspective view illustrating an example in which a lock mechanism according to an embodiment of the present disclosure is applied to a folding chair. In FIG. 13, a backrest 71 is fixed to a wall surface 73, and a seat body 72 is attached to the backrest 71. The seat body 72 is in the locked state when the seat body 72 is in the horizontal position, and the seat body 72 can be folded by unlocking the lock mechanism.

Although a lock mechanism according to an embodiment of the present disclosure has been described above, the present disclosure is not limited to the embodiment described above, and modifications can be made as required. For example, while the movable bracket 3 (first bracket) and the fixed bracket 4 (second bracket) are coupled by the hinge shaft 5 in such a manner that the movable bracket 3 and the fixed bracket 4 can rotate with respect to each other in the embodiment described above, the movable bracket 3 may be attached to the installation target object, and the fixed bracket 4 may be foldable. In such a case, the dimensions and shape of the brackets can be modified as required.

Although the long hole 13 has been described with regard to an example in which the inner faces face each other at an equal distance in FIG. 5 or the like, the present disclosure is not limited to this, and the long hole 13 may have an expanded part (see FIGS. 9(*d*) to 9 (*f*)), for example.

REFERENCE SIGNS LIST

1 lock mechanism
2 folding table
3 fixed bracket
4 movable bracket
5 hinge shaft
6 installation plate
8, 28 fixture piece
10 look unit
11 lock shaft support shaft
12 lock shaft
13 long hole
15 biasing spring
17, 18 rotational movement prevention stopper
21 first side face
22 second side face
24 protrusion part
30 unlocking lever

What is claimed is:

1. A lock mechanism, comprising:
a first bracket;
a second bracket;
a hinge shaft that couples the first bracket and the second bracket to each other in such a manner that the first bracket and the second bracket are capable of rotating with respect to each other; and
a lock unit for locking the first bracket and the second bracket by preventing rotation of the first bracket and the second bracket with respect to each other,
wherein the first bracket and the second bracket are provided with a rotational movement prevention stopper, the rotational movement prevention stoppers abutting against each other, when the first bracket or the second bracket is rotated in a locking direction, thereby preventing the rotation in the locking direction from proceeding beyond a predetermined position,
the lock unit comprises:
a lock shaft attached in such a manner that the lock shaft is capable of moving in a long hole formed in the first bracket;
a lock shaft support shaft rotatably and slidably attached to the first bracket;
a fixture piece that is fixed to the lock shaft support shaft, and rotates to push the lock shaft to release the locking as the lock shaft support shaft rotates or slides; and
a biasing spring that biases the lock shaft in a direction in which the lock shaft abuts against the second bracket,
the rotational movement prevention stoppers abut against each other to prevent rotation of the first bracket and the second bracket in the locking direction without backlash, and
provided that an inner side face of the long hole is a first side face, and a side face of the second bracket is a second side face,
when the rotational movement prevention stoppers abut against each other, the lock shaft is in contact with both the first side face and the second side face, and a pair of tangents to the lock shaft at points of contact of the contact form a wedge with a vertex facing in the direction of movement of the lock shaft so that the first bracket and the second bracket are in a locked state in which rotation of the first bracket and the second bracket in a direction opposite to the locking direction are prevented without backlash.

2. The lock mechanism according to claim 1, wherein the mechanisms for implementing the locked state are provided at two, left and right, positions along an axial direction of the hinge shaft.

3. The lock mechanism according to claim 2, wherein the lock shaft and the fixture piece are separate from and independent of each other, the lock shaft is capable of moving in the long hole without being restrained by the lock shaft support shaft or the fixture piece, so that the lock shaft is prevented from going into the locked state at only one of the two, left and right, positions.

* * * * *